Jan. 25, 1949.　　　M. E. MARTELLOTTI　　　2,459,826
FLUID PRESSURE BEARING
Filed Sept. 30, 1941　　　3 Sheets-Sheet 1
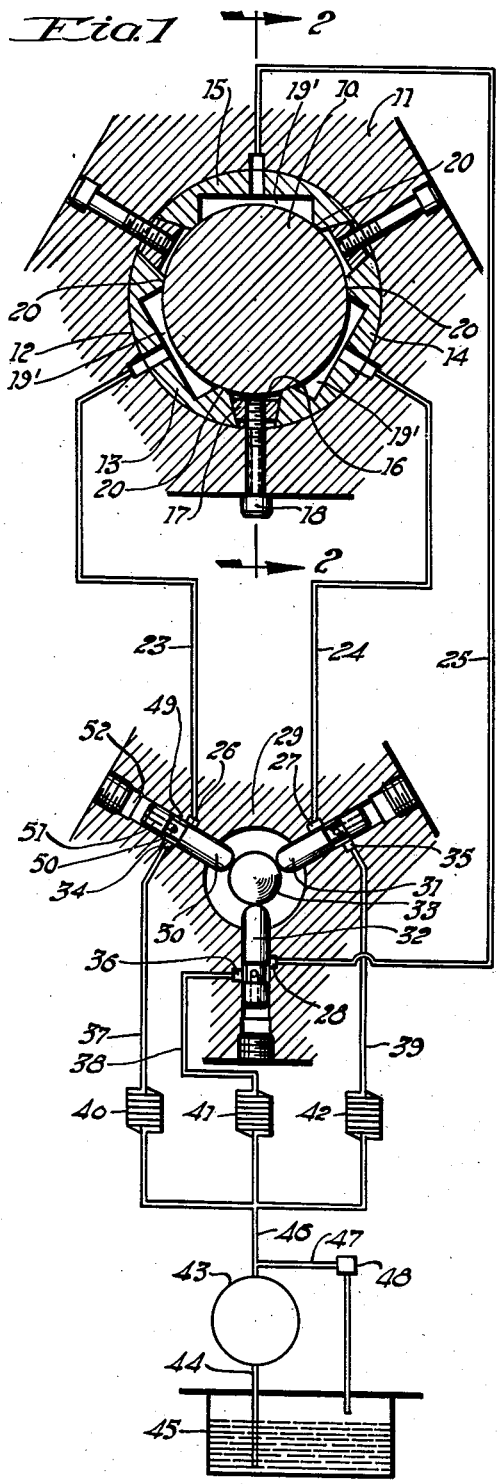
INVENTOR.
MARIO E. MARTELLOTTI
BY
*A. K. Parsons*
ATTORNEY.

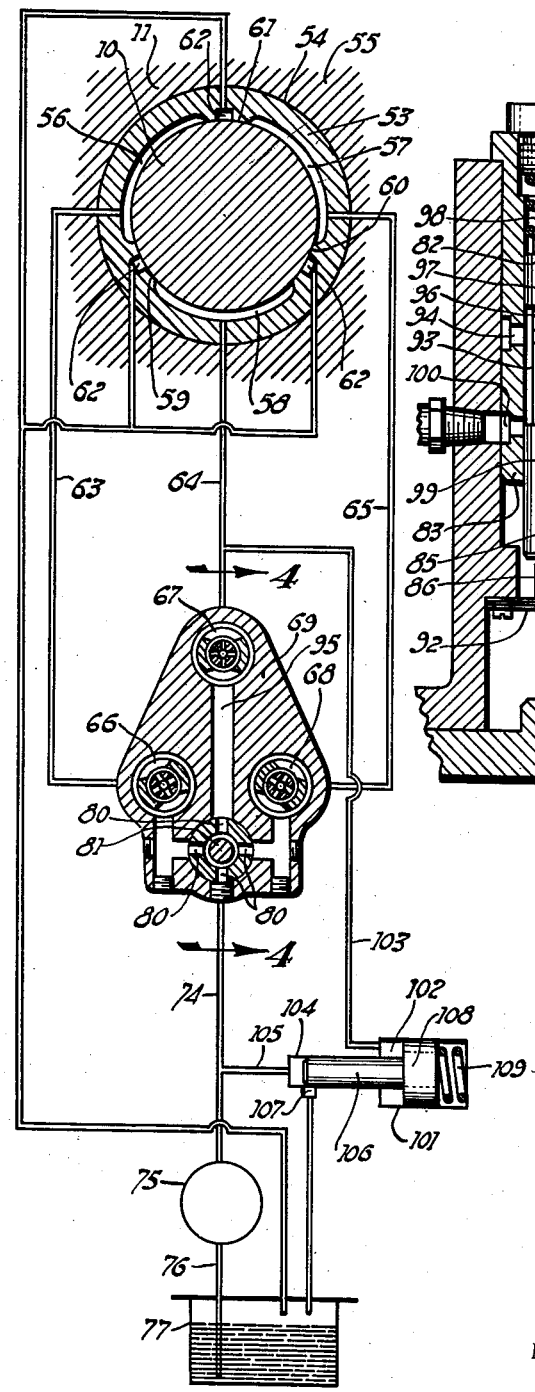

Jan. 25, 1949.                M. E. MARTELLOTTI                2,459,826
                              FLUID PRESSURE BEARING
Filed Sept. 30, 1941                                          3 Sheets-Sheet 3
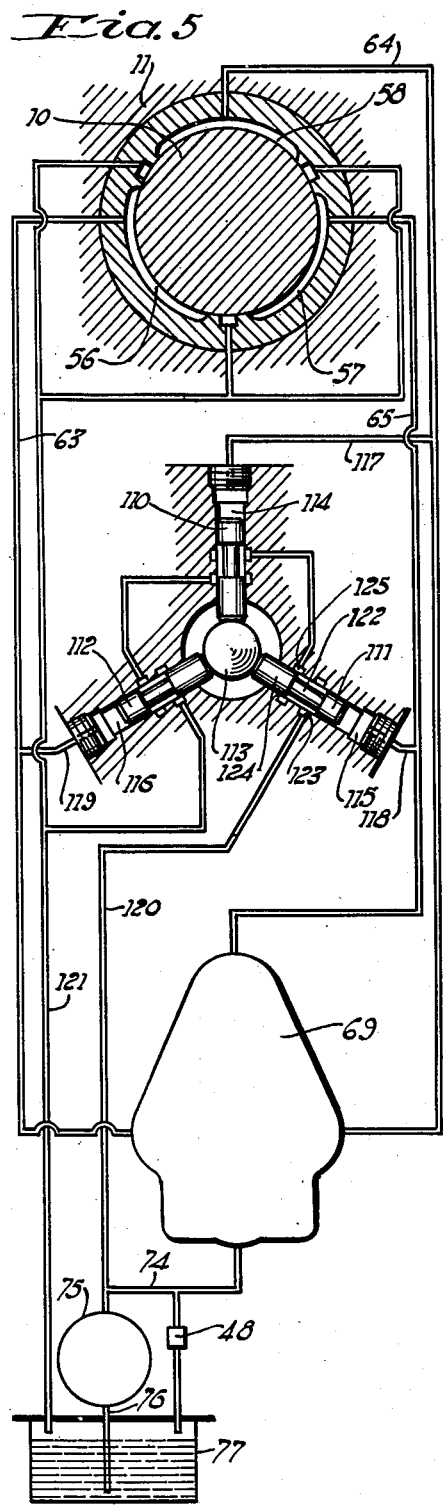
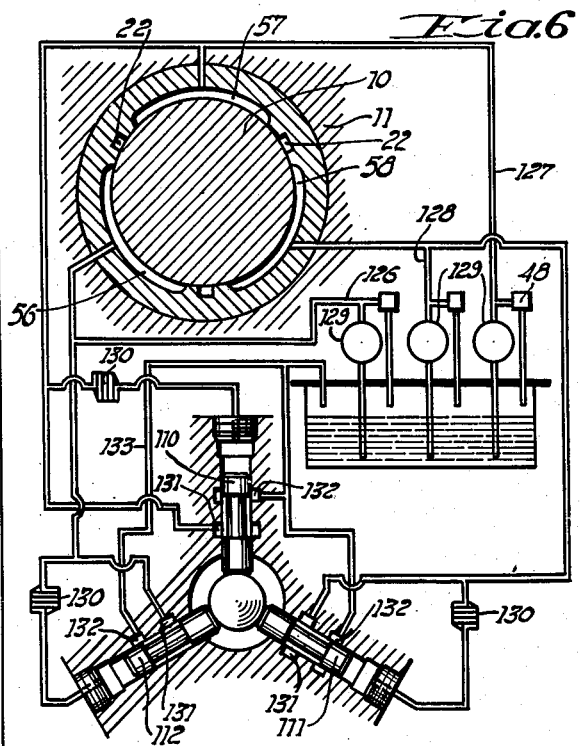
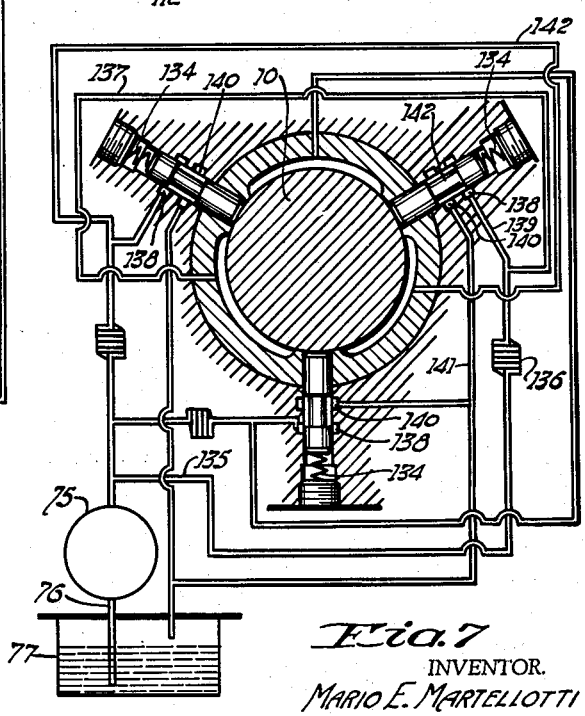
INVENTOR.
MARIO E. MARTELLOTTI
BY
AHK Parsons
ATTORNEY.

Patented Jan. 25, 1949

2,459,826

UNITED STATES PATENT OFFICE 2,459,826

FLUID PRESSURE BEARING

Mario E. Martellotti, Cincinnati, Ohio, assignor to The Cincinnati Milling Machine Company, Cincinnati, Ohio Application September 30, 1941, Serial No. 413,005

15 Claims. (Cl. 308—121)

This invention relates to improvements in bearings.

An object of this invention is to provide an improved fluid pressure type of bearing which is automatic in operation in preventing lateral displacements of a journal mounted therein.

Another object of this invention is to provide a bearing which is highly efficient in operation due to low friction losses and which will maintain the journal in the same position with respect to the bearing under both static and operating conditions.

A further object of this invention is to provide auxiliary means for amplifying pressure differentials created in a fluid pressure bearing by decentralizing movements of the journal in order to develop larger force components for opposing such movements.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a diagrammatic view of a hydraulic control circuit illustrating the principles of this invention.

Figure 2 is a section on the line 2—2 of Figure 1.

Figure 3 is a diagrammatic view showing a modified form of the invention.

Figure 4 is a section on the line 4—4 of Figure 3.

Figures 5, 6 and 7 are diagrammatic views of other forms of this invention.

In fluid pressure bearing structures of the type shown in copending application for Bearing, Serial No. 393,212, filed in the United States Patent Office on May 13, 1941, now abandoned provision is made for creating a fluid pressure film in the bearing for supporting the journal out of metal to metal contact with the walls of the bearing and means for automatically differentiating the pressure in different parts of the film automatically in response to any lateral shifting of the journal to maintain the journal in the same position regardless of eccentric loading thereon.

This invention deals with improvements in bearings of the foregoing type and more specifically to means for accentuating the pressure differentials created in such bearings so as to provide larger resultant force components for balancing purposes, thereby rendering the bearing suitable for use under severe conditions such as where transient eccentric heavy loads are applied to the journal or shaft.

In Figures 1 and 2 of the drawings the reference numeral 10 indicates a journal, and the reference numeral 11 indicates in general a bearing housing in which is formed a bore 21 for receiving a journal. The bore is lined with a sleeve which for simplicity of manufacture and assembly is made in three parts 13, 14, and 15, the adjacent ends of any two portions of the sleeve forming a dovetail slot such as 16 in which is inserted a dovetailed clamping member 17. The clamping member is drawn up tight by a pair of clamping bolts 18 as more particularly shown in Figure 2. The ends of the bore are closed by end pieces 19 which serve to prevent excessive leakage of lubricant from the bearing without hampering operation thereof. If so desired, sealing groove 191 may be provided in the end pieces 19 to assist in preventing leakage.

The sleeve as a whole provides a series of pockets 19' which are uniformly spaced about the journal and these pockets are supplied with a lubricant under pressure. At the end of each pocket there is a land 20, the surfaces of which lie in a circle which is slightly larger in diameter than the diameter of the journal to provide a predetermined clearance for the escape of lubricant from the pockets. This clearance space constitutes a hydraulic resistance to the escape of fluid from the pockets, and it is the amount of this clearance which determines the pressure in the pockets. In other words, the fluid pressure in the pockets should be sufficient to support the journal and whatever load may be applied thereto in such a manner that the journal is held out of metal to metal contact with the lands and thus floats on the lubricant. Therefore, with a given supply of lubricant per unit of time it can be computed what the necessary clearance should be to provide a desired normal working pressure in the pockets. The fluid passing through the resistances flows around the ends 21 of the clamping members 17 and collects in a drain line 22.

In normal operation the journal 10 will be supported in such position that the spacing between the journal and all of the lands will be substantially uniform and with this condition prevailing it should be evident that if the journal should be shifted laterally in any direction due to the application of a transient directional force thereon that the spacing in the various resistances will be changed, thereby blocking the escape of fluid from some of the pockets and permitting a freer escape of fluid from other pockets with the result that a pressure differential will be created between the pockets.

In other words, the pressure in the pocket opposite to the direction of the applied force will increase to oppose movement. It will be obvious in this construction that dependence must be placed upon a very small movement of the journal to produce the necessary pressure differential to oppose suddenly applied transient loads on the journal.

When these loads are large it is difficult to obtain the necessary pressure differential between the pockets by small changes in the value of the hydraulic resistances, and therefore, and in accordance with this invention, auxiliary means have been provided for increasing the amount of the pressure differential without necessitating an increase in the amount of movement of the journal. To this end the supply lines 23, 24 and 25 which supply the three pockets shown are connected to a series of balancing valves which are also responsive to pressure changes in the various pockets and act in such a manner as to amplify any pressure differentiation which might occur.

As shown in Figure 1 the supply lines 23, 24 and 25 are connected to ports 26, 27 and 28 in a balancing valve housing 29 and these ports are controlled by balancing valve plungers 30, 31 and 32 respectively. It will be noted that these plungers are radially arranged and the inner ends abut a centrally located ball 33 whereby an inward movement of any one plunger will effect an outward movement of the other two plungers. Pressure ports 34, 35 and 36 are provided for the respective plungers and these ports are connected by channels 37, 38 and 39 to fixed hydraulic resistances 40, 41 and 42. These fixed resistances are all supplied from a common pump 43 having an intake 44 through which fluid is withdrawn from a reservoir 45, and a delivery line 46 which has a branch connection 47 to an emergency relief valve 48.

Since all of the balancing valve plungers are of the same construction, description of only one of them is believed to be necessary. The plunger 30, for instance, has an annular groove 49 which is so positioned that it is always open to the pressure port 34.

In the bottom of the groove is formed a cross bore 50 which intersects an axial bore 51 terminating in the closed chamber 52 in which the plunger slides. The pressure in line 37 is therefore always acting to urge the plunger 30 in a radially inward direction. In the normal position of the parts the port 26 is partially closed by the plunger, thereby creating a drop in pressure between the annular groove 49 and the line 23. The line 23 carries substantially the same pressure as the pocket 19' and therefore any pressure change in the pocket 19' is immediately communicated to the line 23 whereby a rise in pressure in the line 23 will decrease the pressure drop between the annular groove 49 and the port 26. This tends to block the flow from the channel 37, increasing the pressure therein which is immediately communicated to the chamber 52. A rise in pressure in this chamber, which will momentarily be greater than the pressure in the remaining chambers will cause the plunger 30 to shift radially inward, thereby increasing the opening at the port 26 and decreasing the opening at the ports 27 and 28 of the other two plungers. This will increase the flow in line 23 and decrease the flow in lines 24 and 25, thereby effecting a further differentiation in the various pocket pressures.

This condition will prevail until the eccentric loading on the journal is removed and when it is removed the pressures will automatically rebalance themselves. The resistances 40, 41 and 42 serve to divide the flow from the pump proportionately among the three lines and also serve to prevent a rise in pressure in any of the lines 37, 38 or 39 from kicking back to raise the pressure in the other lines whereby the channels 37, 38 and 39 may be considered as independently restricted channels.

There has thus been provided improved control means which is responsive to any differentiation in pocket pressures to automatically effect an amplification of the pressure differentials with the result that the system may operate at a relatively low pressure but upon any lateral shifting of the journal a high pressure differential may be immediately obtained to oppose the shift.

A modification of the invention is shown in Figures 3 and 4 which is designed to take care of specific cases where the direction of the eccentric loading on the journal is in a known direction and in which a large difference exists between the loading on the spindle when it is running light, and when it is running under load. A good example of such a condition is found in a milling machine in which practically no load is on the spindle when it is running light except for its own weight, while when it is running in a cut there is a large resultant force tending to raise or lift the spindle.

In Figure 3 the reference numeral 10 indicates the spindle and the reference numeral 53 indicates the sleeve fixed in the bore 54 of a spindle bearing support indicated generally by the reference numeral 55. The sleeve 53 is provided with a plurality of pockets 56, 57 and 58, thus constituting three pockets which number is shown for illustrative purposes.

The pockets are separated by lands 59, 60 and 61 and each land has a collector groove 62 formed therein for collecting and returning fluid to reservoir. The pockets 56, 57 and 58 are provided with supply lines 63, 64 and 65 respectively and these supply lines terminate in balancing valves which are indicated generally by the reference numerals 66, 67 and 68 which are mounted in a valve housing 69. The housing also contains a flow dividing valve which, as shown in Figure 4, comprises a plunger 70 having an annular groove 71. The plunger is slidably mounted in a sleeve 72 in which is formed a pressure groove 73 which is always in communication with the groove 71.

A pump supply line 74 is connected to this port and is supplied with pressure by a pump 75 having an intake 76 through which fluid is withdrawn from a reservoir 77. A spring 78 continuously urges the plunger 70 against an adjustable threaded stop 79. The sleeve has a series of radial ports 80 which direct fluid to the various balancing valves. The plunger 70 is adjusted in such position that the spool 81 of the plunger restricts the flow to all of these ports and thereby acts as a hydraulic resistance which causes a drop in pressure and thus acts to prevent a kick back from one balancing valve to the other in case of a sudden rise in pressure.

Also, in Figure 4 is shown one of the balancing valve plungers which is indicated by the reference numeral 82. This plunger is slidably mounted in a bore of a sleeve 83 and is continuously urged in one direction by a spring 84. The end of the plunger has a centrally located socket 85 in which is mounted a ball 86 for frictionless engagement with a balancing disc 87. The balancing disc 87 is centrally supported on a ball 88 located in the end of an adjustable support 89. This support is threaded at 90 in the base of the housing and provided with a lock nut 91. The balancing disc is connected by a series of leaf springs 92 to the housing and the three balancing valves engage the disc at three equally spaced points whereby the springs 84 are continuously acting against the springs 92 to hold the parts in balance.

Each balancing valve plunger, such as the plunger 82, has an annular groove 93 which is positioned to be in constant communication with a supply port 94 which is connected by a passage 95 to one of the radial ports 80. Within the groove are cross-drilled holes 96 that intersect an axial bore 97 whereby the fluid in the groove may flow to the chamber 98 and act on the upper end of the plunger in conjunction with the spring 94 to hold the plunger in engagement with the balancing plate 87.

The spool 99 is normally positioned to partially close the outlet port 100 which is connected to one of the pocket channels such as 64. Thus, any rise in pressure in the channel 64 due to increase in pressure in the pocket 58 will cause a rise in pressure in the groove 93 and thereby in the chamber 98, resulting in downward movement of the plunger which increases the opening at port 100 whereby more fluid will flow to the channel 64. The downward movement of the plunger will act through the balancing plate 87 to cause upward movement of the other two plungers, thereby decreasing the flow to the other two channels such as 63 and 65.

This accentuates the pressure differential between the pocket 58 and the remaining pockets. On the other hand, an increase in pressure in either pocket 56 or 57 will effect a reverse result, thereby decreasing the pressure in the pocket 58. The construction shown in Figure 3 is designed especially to take care of the situation where the loading on the spindle is in an upward direction and therefore when the load comes on, the pressure in pockets 56 and 57 would be increased and the pressure in pocket 58 would decrease. It should be apparent that the higher the supply pressure, the greater is the possibility of obtaining greater pressure differentials.

Means have, therefore, been provided whereby when the working load is applied, the supply pressure to the system automatically increases. This is accomplished by providing a differential valve, indicated generally by the reference numeral 101, which has a large cylinder 102 connected by channel 103 to channel 64, and a small cylinder 104 which is connected by channel 105 to the supply line 74. The plunger has a small piston portion 106 which controls the opening of a return port 107 and a large piston portion 108. A spring 109 continuously urges the valve piston in a direction to close the exhaust port 107. This spring works against the pressure in the two cylinders. The pressure in chamber 104 plus the pressure in chamber 102 is great enough to hold the port 107 partially uncovered but when the pressure in pocket 58 drops due to the elevating of the journal 10 the pressure in chamber 102 drops whereby the spring 109 is enabled to effect a further restriction at the port 107 thereby causing the pressure in line 74 to rise. This increases the flow to the various channels in accordance to their restrictions with the result that a large pressure differential is created for balancing purposes.

The construction shown in Figure 3, as previously mentioned, is applied in the case where the direction of the eccentric loading is known, while in Figure 5 a modification of the invention is shown in which the supply pressure is increased regardless of the direction of the eccentric load. In this construction the differential valve of Figure 3 is replaced by a balaning valve assembly comprising three balancing valve plungers 110, 111 and 112 which are radially arranged around a central member, such as a ball 113 whereby any movement of one plunger will effect a resultant movement of the other two plungers. These plungers are reciprocably mounted in bores 114, 115 and 116 which are connected by branch lines 117, 118 and 119 to the supply channels 63, 64 and 65. The supply line 74 from the pump 75 has a branch line 120 which runs serially through the valves and back to reservoir through the channel 121. In other words, each plunger has an annular groove 122 which is in constant communication with a supply port 123 while a spool 124 partially closes the outgoing port 125. Thus, a rise in pressure in any one of the supply lines will cause movement of at least one of the plungers in a direction to restrict the bypass flow from the pump to reservoir through the channels 120 and 121 and thereby increase the supply pressure to the entire system.

In the modification shown in Figure 6 the pressure pockets 56, 57 and 58 are directly connected by channels 126, 127 and 128 respectively to individual pumps 129. Each pump has a balancing valve bypass control to reservoir whereby when the balancing valves are in a normal position a certain quantity from each pump is bypassed to reservoir to maintain a normal operating pressure but when the pressure in the pockets is unbalanced the balancing valves shift in such a manner as to decrease the bypass flow from one pump and increase the bypass flow from the other pumps, whereby the pressure in one pocket will be raised and the pressure in the other pockets reduced.

The balancing valve plungers 110, 111 and 112 are of the same construction as shown in Figure 5 and the end of each plunger is connected by a hydraulic resistance 130 to the respective pump supply line.

Each valve has a port 131 which is directly connected to each pump supply line. Each valve also has a port 132 which is connected to a reservoir line indicated generally by the reference numeral 133. When the balancing valves are in the normal position the exhaust ports 132 are partially covered by spools on the balancing valves whereby should the balancing valves shift in either direction it will either increase or decrease the flow to reservoir and thereby increase or decrease the pressure in the particular pump supply line to which it is connected. Thus, individual pumps may be utilized and the balancing valves may still be connected in such a manner as to increase the pressure differential between the pockets in addition to that normally produced by the shifting of the journal.

In the modification shown in Figure 7 the balancing valve plungers 110, 111 and 112 are positioned to act directly on the journal and are held in engagement therewith by springs 134. Each balancing valve is arranged to control the pressure in the pocket diametrically opposite the plunger. For instance, the flow to the pocket 56 goes from the pump 75 through channel 135, hydraulic resistance 136, and channel 137 to the pocket 56. The valve 111 has a pressure port 138 to which a branch 139 of channel 137 is connected and an exhaust port 140 which is connected by channel 14 to reservoir. The annular groove 142 in the plunger is of such length as to partially close the port 138 and thereby control the amount of fluid bypassing to reservoir.

Thus, any outward shifting of the plunger by the journal will increase the opening of port 138 and thereby lower the pressure in pocket 56, while inward movement of the plunger will decrease the opening at port 138 and thereby raise the pressure in pocket 56. The other two pockets are connected in a similar manner for control by their respective plungers.

There has thus been provided an improved control system for a pressure lubricated bearing, which will respond to any radial shifting of the journal to effect an initial change in pressures, and these changes will act to effect a further pressure differentiation and thereby a more forceful reaction to oppose eccentric loading on the journal.

What is claimed is:

1. In a fluid pressure bearing structure for a journal, the combination of a bearing member for said journal having a plurality of lubricant receiving pockets formed in circumferentially spaced relation about said journal, independent lubricant supply means for the several pockets, collector grooves positioned between the respective pockets, means functional of the position of the journal for controlling the escape of fluid from said pockets to said grooves to determine the necessary pressures in said pockets to hold the journal in a normal running position whereby any shifting of the journal will disturb said pressures, and valve means responsive to any disturbance of said pressures for readjusting the resistance to flow in the several channels and thereby readjust said pressures to a sufficient extent to reposition the journal to its normal running position.

2. In a pressure lubricant bearing structure for a journal, the combination with a bearing member having a plurality of lubricant receiving pockets formed circumferentially therein and a collector groove between each pair of pockets, of means for supplying said pockets with lubricant, means functional to the position of said journal for controlling the escape of lubricant from said pockets to said grooves and thereby determining and controlling the pressures in the several pockets, a source of lubricant supply, flow dividing and balancing valve means for dividing the flow from said source of pressure among the several pockets in a definite proportionate relationship, and means responsive to a change in pocket pressures produced by movement of the journal to increase the quantity of flow to the several pockets.

3. In a bearing structure for a journal, the combination with a bearing member having a plurality of fluid receiving pockets formed in circumferentially spaced relation therein and about said journal, collector grooves between the several pockets whereby the position of the journal controls the escape of fluid from the pockets to the grooves and thus determines the pressures in said pockets, a supply channel for each pocket, an independent source of pressure for supplying each channel, and balancing valve means responsive to changes in pocket pressures due to shifting of the journal from its normal running position to differentiate the quantities supplied to the several pockets.

4. In a fluid bearing structure for a journal, the combination of an outer member having a plurality of internal lubricant receiving pockets formed therein in circumferential relation to the journal, of a member portion having a journal portion received within the bearing, individual channels for delivering lubricant under pressure to the several pockets, valve means individual to the respective channels and responsive to increase of pressure in an individual channel for decreasing the resistance of discharge of lubricant into the channel, and means interconnecting the valves of the several channels for insuring their simultaneous inverse adjustments.

5. In a bearing construction, in combination, a pair of interfitting bearing members with clearance therebetween to allow for relative lateral movement upon imposition of a load on one of said members, one of said members having a plurality of hydraulic pockets in its bearing surface which are spaced about its axis and open toward said clearance, a pump connected to each of said pockets to supply fluid under pressure thereto, throttling means between said pump and the inlet of one of the pockets on the opposite side from said load, said throttling means being responsive to said relative movement in the direction induced by the load to enlarge its opening and thereby increase the pressure of fluid in said pocket, and throttling means between said pump and the inlet of a pocket on the side of said member from which said load is imposed, said last mentioned throttling means being responsive to said same relative movement to simultaneously contract its opening and thereby decrease the pressure of fluid in said last mentioned pocket.

6. In a bearing construction, in combination, a pair of interfitting bearing members in which there are circumferentially spaced hydraulic pockets in the bearing surface of one of said members, a pump having connections to force liquid into said pockets, means in one of said connections responsive to lateral movement of one of said members to throttle the output of said pump to the inlet of a pocket on the side of said member from which said movement is directed, and means in another of said connections responsive to said movement to increase simultaneously the supply from said pump to the inlet of a pocket on the opposite side of the bearing.

7. In bearing construction, in combination, a hydraulic pump, means forming a plurality of hydraulic pockets connected to said pump and positioned to exert pressure at different points about the axis of the bearing, at least two of which can respectively and simultaneously oppose and enhance the resultant of load on the bearing, a member mounted for lateral movement to move in accordance with change in direction or amount of resultant load, and a plurality of throttling means disposed about said member and corresponding in number and angular spacing with said hydraulic pockets, said successive throttling means being respectively in the hydraulic lines to pockets disposed in the same order and mounted to be actuated simultaneously in accordance with the movement of said member so that each throttling means varies the flow to its corresponding pocket in accordance with changes in the pressure toward the pocket to which it is connected.

8. In a bearing construction in combination, a pair of interfitting bearing members mounted for relative movement according to change in direction or amount of the resultant of load on the bearing, a hydraulic pump, one of said members having a plurality of hydraulic pockets connected to said pump and surrounding the axis of the other member so that the pressure in one pocket opposes and the pressure in one pocket enhances said resultant load, and a plurality of interrelated throttling means disposed in the same order and corresponding in number and angular spacing with said pockets, said throttling means being disposed in the hydraulic lines to said pockets and interrelated with said bearing members to be actuated simultaneously with said relative movement so that each throttling means varies the opening to its corresponding pocket according to variation in pressure on that pocket.

9. In a fluid pressure bearing structure for a journal, the combination of a bearing sleeve having a plurality of lubricant receiving pockets formed therein in circumferential relation to the journal, individual channels for delivering lubricant to the several pockets from a source of supply under pressure, there being clearance space between said journal and sleeve to allow for relative lateral movement therebetween and to provide resistance to flow from the pockets, means to divide the flow of lubricant from said source among said channels, and balancing valve structure connected to said channels between said source and said pockets responsive to relative movement of the journal and said sleeve toward and from each other for varying the quantity of flow delivered to the several pockets in response to any shifting of the journal from its normal running position, said balancing valve structure being connected to the pockets to cause an increase in the pressure of the lubricant in the channel leading to a given pocket in the path of such relative movement between said sleeve and journal and to decrease the pressure of the lubricant in channels leading to pockets opposing said given pocket.

10. A bearing construction according to claim 9 in which the balancing valve structure includes movable plungers controlling flow through said channels with the plungers hydraulically connected to said channels to move in response to pressure changes in said channels resulting from relative movement between said journal and sleeve.

11. A bearing construction according to claim 9 in which a hydraulic resistance is positioned in each channel between said balancing valve structure and said source of supply of lubricant under pressure.

12. A bearing construction according to claim 9 in which a supplemental valve is connected to said pockets and connected between said source and said balancing valve structure, said supplemental valve being responsive to the pressure in said pockets to cause an increase in the pressure of the lubricant supplied to said balancing valve structure whenever the journal moves out of normal running position.

13. A bearing construction according to claim 9 in which said balancing valve structure includes a variable resistance in each channel, said resistances being interrelated and adapted to inversely vary the flow to said pockets in response to any shifting of the journal from its normal running position.

14. A bearing construction according to claim 9 in which a supplemental valve is connected to said pockets and connected between said source and said balancing valve structure, said supplemental valve being responsive to the pressure in said pockets to cause an increase in the pressure of the lubricant supplied to said balancing valve structure whenever the journal moves out of normal running position, and a hydraulic resistance is positioned in each channel between said balancing valve structure and said source of supply of lubricant under pressure.

15. A bearing construction according to claim 9 in which said balancing valve structure includes a variable resistance in each channel, said resistances being interrelated and adapted to inversely vary the flow to said pockets in response to any shifting of the journal from its normal running position, a supplemental valve is connected to said pockets and connected between said source and said balancing valve structure, said supplemental valve being responsive to the pressure in said pockets to cause an increase in the pressure of the lubricant supplied to said balancing valve structure whenever the journal moves out of normal running position, a hydraulic resistance is positioned in each channel between said balancing valve structure and said source of supply of lubricant under pressure, and collector grooves are provided for collecting the lubricant flowing out of said pockets.

MARIO E. MARTELLOTTI.

REFERENCES CITED

The following references are of record in the file of this patent:

UNITED STATES PATENTS

| Number | Name | Date |
| --- | --- | --- |
| 466,645 | Wood | Jan. 5, 1892 |
| 603,260 | Cook | May 3, 1898 |
| 656,310 | Warburton | Aug. 21, 1900 |
| 1,122,051 | Wohlenberg | Dec. 22, 1914 |
| 2,049,343 | Warren | July 28, 1936 |
| 2,053,389 | Asbridge | Sept. 8, 1936 |

FOREIGN PATENTS

| Number | Country | Date |
| --- | --- | --- |
| 244,539 | Italy | Jan. 30, 1926 |